Patented June 7, 1932

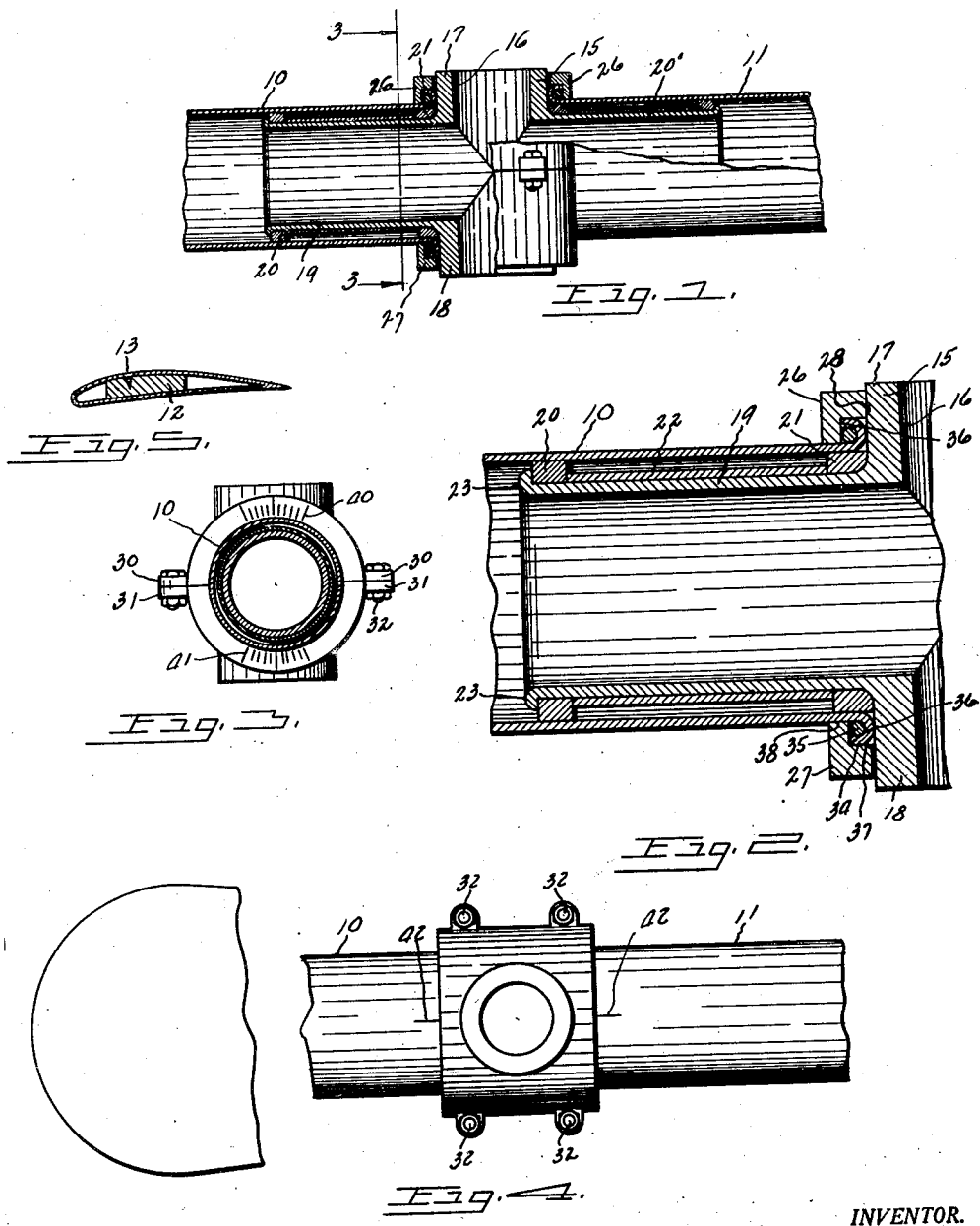

1,862,328

UNITED STATES PATENT OFFICE

FRANK W. CALDWELL, OF DAYTON, OHIO, ASSIGNOR, BY MESNE ASSIGNMENTS, TO HAMILTON STANDARD PROPELLER COMPANY, A CORPORATION OF DELAWARE

PROPELLER

Application filed February 4, 1928. Serial No. 251,897.

This invention relates to propellers and is particularly adapted for use in connection with propellers having a plurality of separate blades which are connected to a hub portion.

The principal object of the invention is to provide a propeller of this character having a hub portion by means of which rotational thrust force is imparted to the propeller, the blades being retained against the action of centrifugal force independently of the means by which the blades are rotationally driven.

A further object of the invention is the provision of a propeller having a plurality of blades having hollow metal root portions into which projections of the hub extend to impart rotational thrust force to the blade, the blade being retained against the action of centrifugal force by means centered on the hub which interconnects the roots of the blades.

Further objects and advantages of the invention will be apparent from the following description and from the drawing in which—

Fig. 1 is a side elevation, partly in central section, of a propeller embodying the present invention;

Fig. 2 is a fragmentary section corresponding to Fig. 1 but drawn to a larger scale;

Fig. 3 is a section through the rear portion of one of the blades on the line 3—3 of Fig. 1;

Fig. 4 is a front view looking in the direction of the axis of the propeller; and Fig. 5 is a section through one of the blades taken near the tip portion.

The invention is herein shown as embodied in an aeronautical propeller having a plurality of hollow metal blades, although it should be understood that the invention is susceptible of other modifications and uses. In the drawing the propeller comprises a plurality of blades 10 and 11 which are preferably of hollow metal construction. They may be made of sheet steel or other suitable material. As shown, they have their tip portions reinforced by a micarta reinforcement 12 to which the hollow metal tip portions may be rigidly secured as by means of screws 13. The root portions of the blades are of hollow circular cross-section.

A hub 15 preferably in the form of an integral steel forging or a manganese bronze casting is provided with a tapered bore 16 by which it is made fast to an engine driven shaft. Between the end portions 17 and 18 of the hub are two radially extending hollow portions or projections 19 and 20' which are of a smaller diameter than the inside diameter of the roots of the blades. These projections extend into the hollow root portions of the blades, and between the projections and the blades are rings 20 and 21 preferably of micarta or similar material having some resiliency. The two rings 20 and 21 of each of the projections are spaced apart by sleeves 22 of any suitable material. The rings 21 abut against the end portion 17 of the hub. Each ring 20 is prevented from moving inwardly by the sleeves 22 which abut at their ends against the rings 21. After the rings and sleeves have been applied to the projections of the hub the hollow end portions of these projections may be spun over or otherwise formed as indicated at 23 to retain the rings in their proper position. The rings are preferably of cylindrical form and they are rather tightly but slidingly fitted on the projections and within the blade roots so that the blades may be applied by readily sliding them inwardly toward the axis of the hub after the rings are in their proper positions on the hub projections. The rings 20 and 21 being constructed of a material having some resiliency permits the blades to be driven from the engine by the hub in such a manner as to absorb some of the shocks and torque variations and furthermore prevents breakage of the blades at the root portions where they are engaged by the rings. It will be clear that the drive force is imparted to the blades not at one point, but throughout the entire contact area of the micarta rings with the blade roots. The projections 19 and 20' of the hub are thus effective in imparting rotational thrust force to the blades although it will be apparent that the connection between these projections and the blades is such that the projections are quite ineffective in restraining the blades against the action of centrifugal force.

To retain the blades against the action of centrifugal force a pair of complementary blade retainers 26 and 27 each constructed in a form of a semi-cylindrical saddle are provided. The retainer 26 at the end 17 of the hub is preferably provided with a hollow bore 28 which is slidingly fitted on the outside of the hub end 17 so that the retainer 26 is centered on the hub. The retainer 27 is also provided with a hollow bore which may if desired be slightly larger than the outside diameter of the hub end 18, and the two retainers are provided with coupling flanges 30 and 31 which extend outwardly adjacent one another so that the two retainers may be fixed together as by means of the attaching bolts 32. The inner ends of the blade roots are preferably turned outwardly as indicated at 34. This may be done by spinning the blade ends around a ring 35 and then filling and finishing off a flat inner surface 36 as by filling with metal and then cutting or otherwise flattening the surface 36. This surface 36 is engaged by the two blade retainers 26 and 27, which thus constitute a single blade retaining means directly interconnecting the two blades and the hub. As shown in Fig. 1 the blade retainers have inwardly flanged portions 37 which embrace the out-turned ends of the blade roots, and are also provided with cylindrical bores 38 which tightly embrace adjacent outer portions of the blade roots to retain the blades in the hub at their proper angle. It will thus be apparent that the blades are retained against the action of centrifugal force, and are directly interconnected one with another and with the hub entirely independently of the hub projections 19 and 20' by means of which the blades are driven. Any weakening which may occur in the driving portions of the hub have no effect on the means by which the blades are retained against centrifugal force. Slight failures in the driving means are not subjected to centrifugal force stresses of the blades and slight failures in the blade retaining means are not subjected to driving force. Consequently both the blade-driving means and the blade-retaining means may continue to operate effectively even though some partial or slight failure in one or both of these parts may develop.

The flanges 37 of the blade retainers are preferably provided with scale markings 40 and 41, one for each of the blades, and the adjacent portions of the blades are also provided with index lines 42 adapted to cooperate with the scales so that the number of degrees to which the blades are set may be indicated by these scales and index marks. It will be apparent that the angles of the blades are readily adjustable by merely loosening the bolts 32 and then rotating the blades to the desired setting after which the bolts are again tightened, and the blades will then be held in fixed position on the hub. The bore 38 of the blade retainers, as previously mentioned, is of such size as to cause the blade retainers to tightly grasp the inner or root portions of the blades when the bolts 32 are tight.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A propeller comprising a pair of blades having hollow root portions, a hub, independent force transmitting means on said hub engaging inner and outer sides of the root portions of the blade, respectively, one of said means being of integral construction and adapted to transmit rotational thrust force to the blades without materially restraining the blades against centrifugal force, and the other of said means restraining said blades against centrifugal force and being substantially ineffective in transmitting rotational thrust force.

2. A propeller comprising a blade having a hollow metal root portion, a hub having a projection extending into said hollow root portion to impart rotational thrust force to the blade and on which the blade is adjustable for variations in pitch setting, and means directly engaging the inner end of the blade and extending around the hub to retain the blade against centrifugal force.

3. In a propeller, a pair of blades having hollow root portions, a hub having projections extending radially therefrom and adapted to project into the hollow root portions to impart rotational thrust force to the blades, and a pair of complementary semi-cylindrical blade retainers adapted to engage the inner ends of the blades and retain the blades against the action of centrifugal force.

4. In a propeller, in combination, a pair of blades having hollow metal root portions, a hub having a pair of radially extending projections adapted to engage the root portions of the blades and impart rotational thrust force thereto, resilient means interposed between the hollow root portions of the blades and the said projections, and means independent of said projections for engaging the root portions of the blades to interconnect the blades and retain them against the action of centrifugal force.

5. In an aeronautical propeller, a plurality of blades having hollow metal root portions, an integral hub member having a plurality of radially extending hollow projections of smaller outside diameter than the inside diameter of the roots of the blades, resilient means between said projections and said blades whereby the said projections impart rotational thrust force to the blades without restraining them against centrifugal force, and blade retaining means centered on the hub portion and engaging the roots of the blades directly and operating independently of said projections to restrain the blades against centrifugal force without imparting rotational thrust force to the blades.

6. A propeller comprising a pair of blades having hollow root portions, a hub having integral projections extending radially therefrom into the hollow root portions of the blades to impart substantially all rotational thrust force to the blades, and a pair of connected blade retainers centered about and arranged axially of the hub and having socket portions engaging the inner ends of the blades and effective against centrifugal force.

7. In a propeller, a propeller blade, a member for imparting rotational thrust force to the blade and a separate member comprising sections adjustably movable axially of the propeller toward one another for retaining the blade against centrifugal force and imparting substantially no centrifugal strains to said first member, and means for rigidly interconnecting said sections.

8. A propeller comprising a blade, a hub having an integral radial projection for imparting rotational thrust force to the blade, and retaining means directly engaging the blade circumferentially at the root thereof and separate from said hub for resisting centrifugal force on the blade.

9. A propeller comprising a plurality of blades having hollow root portions, a hub, said hub having a means engaging the inner side and a means engaging the outer side of each root portion in an adjustable manner permitting variations in blade angle settings, one of said means for each root portion being adapted to transmit substantially all rotational thrust force to a blade without materially restraining the blade against centrifugal force, and the other of said means restraining the blade against centrifugal force and maintaining the blade angle setting and being substantially ineffective in transmitting rotational thrust force.

In testimony whereof I hereto affix my signature.

FRANK W. CALDWELL.